H. P. NIELSON & E. E. FOSTER.
HARROW.
APPLICATION FILED JAN. 15, 1915.
1,202,569.
Patented Oct. 24, 1916.
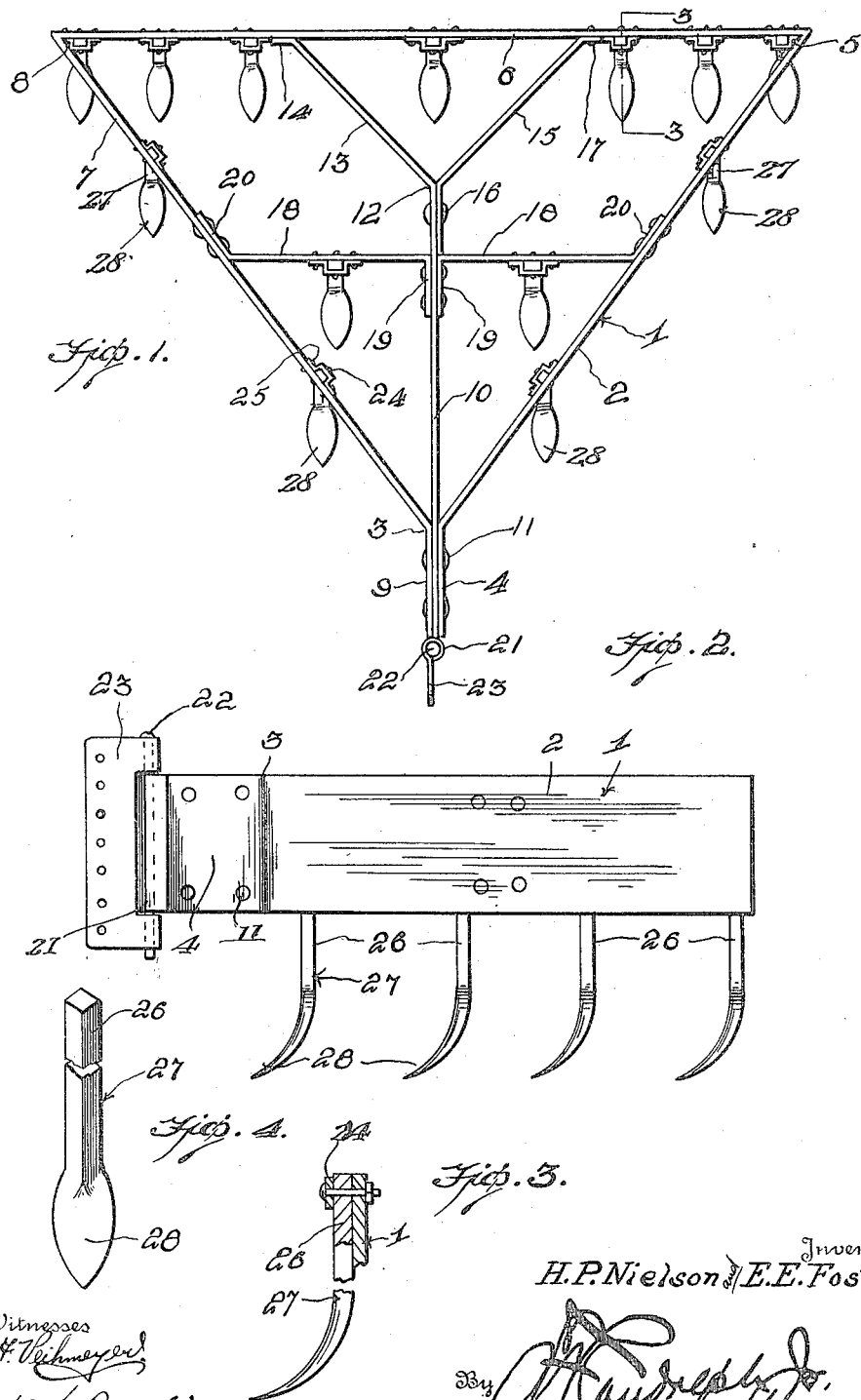

UNITED STATES PATENT OFFICE.

HANS P. NIELSON AND EZRA E. FOSTER, OF BLANCA, COLORADO.

HARROW.

1,202,569.

Specification of Letters Patent.

Patented Oct. 24, 1916.

Application filed January 15, 1915. Serial No. 2,434.

*To all whom it may concern:*

Be it known that we, HANS P. NIELSON and EZRA E. FOSTER, citizens of the United States, residing at Blanca, in the county of Costilla and State of Colorado, have invented certain new and useful Improvements in Harrows; and we do hereby declare the following to be a full, clear, and exact description of the invention, such as will enable others skilled in the art to which it appertains to make and use the same.

This invention relates to new and useful improvements in harrows and has for its principal object to provide a harrow which may be easily and cheaply constructed of a relatively thin metal thus avoiding the necessity of using a heavy and complicated device.

Another object of the invention is to provide a harrow which is particularly simple in construction and is exceedingly durable in use.

A still further object of the invention is to provide a harrow which is designed to offer the least resistance to the draft animal and yet which will maintain its efficiency.

With these and other objects in view, the invention consists in the novel construction and arrangement of parts which will be fully set forth in the following specification and accompanying drawing, in which—

Figure 1 is a top plan view of a harrow constructed in accordance with this invention, Fig. 2 is a side view in elevation of Fig. 1, Fig. 3 is a detail sectional view of a portion of the harrow, and one of the teeth, and Fig. 4 is a perspective view of one of the harrow teeth illustrating the same broken away to more clearly show the details of construction.

Referring now to the drawing by characters of reference, the numeral 1 designates as an entirety the frame of the harrow comprising a bar 2; this bar is bent near one end as at 3 to form the forward extension 4 which forward extension projects at an obtuse angle with relation to the bar as clearly shown in the drawing. This bar 2 is again bent at its opposite end, as at 5, to form an acute angle and extend for substantially the entire length of the bar to form a rear harrow bar 6. This rear harrow bar is provided with the angular extension 7 at its end opposite the bent end 5 and this extension 7 forms the acute angle 8 at the point where it joins the bar 6. A suitable forward extension 9 is formed on the bar 7 and projects in a plane parallel to the extension 4. A suitable central brace rod 10 is riveted or otherwise secured as at 11 between the parallel extensions 4 and 9 and extends rearwardly as clearly shown in Fig. 1 to the point 12 and then bent angularly as at 13 and riveted or otherwise secured as at 14 to the rear bar 6. A suitable rod 15 is riveted or otherwise secured as at 16 to the bar 10 near the point where it joins the angular extension 13 and this rod 15 extends angularly with relation to the portion 10 and is riveted or otherwise secured as at 17 to the rear bar 6. It will thus be seen that the device is reinforced throughout its entire length and the rear bar is also provided with brace rods. Suitable transversely extending brace rods 18 are provided at each end with the angular extensions 19 and 20, which engage the bars 10 and 2 and 7, respectively and are riveted or otherwise secured thereto as clearly shown in the drawing. Formed at the forward end of the bar 10 is the sleeve 21 which is designed to receive the pivot pin 22, which supports the clevis 23 and forms a connection between the clevis and the harrow.

In order to support the harrow teeth on the harrow there are provided at spaced intervals on the bars the U-shaped retainers 24 which are riveted or otherwise secured thereto as at 25. These retainers provide rectangular recesses or apertures in which the stems 26 of the harrow teeth extend. On the triangular bars 2 and 7 of the harrow the harrow teeth, illustrated in Fig. 4 and designated generally by the numeral 27, are used and these teeth are provided with the blades 28 which extend angularly with relation to the faces of the rectangular stems 26. This arrangement is designed to permit one of the faces of the stem to lie against the inner face of the bars and yet permit the shovel 28 of the harrow to project forwardly as clearly shown in Fig. 1. The remaining teeth which are illustrated in Fig. 3 are so arranged that the shovels project in a plane parallel to two of the faces thus insuring the proper positioning of the shovel on the cross bars 6 and 18.

It will be apparent from the foregoing that in use, a harrow constructed in accordance with this invention may be easily and cheaply manufactured at a minimum amount of expense and is also easily handled and will present the least amount of resistance to the draft animal. It will thus be seen that the load on the animal will be lightened in view of the peculiar formation of the device.

It is to be understood that this harrow may be used for tearing up sod, uprooting brush and may be put to analogous uses without departing from the spirit and scope of the invention in any way.

While in the foregoing there has been shown and described the preferred embodiment of this invention, it is to be understood that such changes may be made in the combination and arrangement of parts as will fall within the spirit and scope of the invention as defined in the appended claim.

What is claimed is:—

A harrow including a frame formed of a single piece of metal bent in the shape of a triangle, the forward free ends of said triangle extending outwardly and parallel at spaced distance apart, a clevis pivotally supported by and located in front of the parallel extensions, a brace rod extending longitudinally through and connected between the parallel extensions and extending rearwardly to a point within close proximity to the rear wall of the frame, and bent angularly and secured to the inner face of the rear wall of the frame, a diagonal brace rod secured at one end to the inner face of the rear wall of the frame and at its opposite end to the inner end of the brace rod at its point of juncture with its angularly bent end, a pair of reinforcing bars secured to the inner face of the side wall of the frame and at their opposite ends to opposite sides of the brace rod and located approximately at the center of the frame, a plurality of substantially U-shaped retainers secured at spaced distance apart to the inner faces of the side, rear and reinforcing bars and a plurality of shovels secured in the U-shaped retainers.

In testimony whereof we affix our signatures in presence of two witnesses.

HANS P. NIELSON.
EZRA E. FOSTER.

Witnesses:
FRANK SCHIVALS,
T. D. KEOWN.

Copies of this patent may be obtained for five cents each, by addressing the "Commissioner of Patents, Washington, D. C."